United States Patent
Ash et al.

[11] Patent Number: 6,021,191
[45] Date of Patent: Feb. 1, 2000

[54] AUTOMATIC ROUTING TECHNIQUE

[75] Inventors: Gerald Richard Ash, West Long Branch; Jiayu Chen, Middletown; Saul Daniel Fishman, Edison; David Zerling, Rumson, all of N.J.

[73] Assignee: AT&T Corp., New York, N.Y.

[21] Appl. No.: 08/811,979

[22] Filed: Mar. 5, 1997

[51] Int. Cl.[7] .............................. H04M 7/00; H04M 3/42
[52] U.S. Cl. ........................ 379/221; 379/207; 379/219; 379/230
[58] Field of Search ................................... 379/221, 219, 379/220, 229, 230, 222, 207

[56] References Cited

U.S. PATENT DOCUMENTS

| | | | |
|---|---|---|---|
| 5,068,892 | 11/1991 | Livanos | 379/221 |
| 5,101,451 | 3/1992 | Ash et al. | 379/221 |
| 5,155,763 | 10/1992 | Bigus et al. | 379/113 |
| 5,509,055 | 4/1996 | Ehrlich et al. | 379/133 |
| 5,526,414 | 6/1996 | Bedard et al. | 379/221 |
| 5,559,877 | 9/1996 | Ash et al. | 379/221 |
| 5,705,998 | 1/1998 | Stampfl | 379/221 |

Primary Examiner—Scott Wolinsky
Assistant Examiner—Benny Q. Tieu
Attorney, Agent, or Firm—Robert B. Levy

[57] ABSTRACT

The routing of calls from one network (100) to another network (170) may be accomplished by tracking the call completion history over each trunk group ($174_1$–$174_2$) connecting the networks. From a knowledge of the call completion history for each route, a Completion Rate Factor (CRF), representing the ratio of completed calls to all calls attempted is computed. The route having the CRF representing the highest number of completions is then selected. Typically, the process is dynamic, so that if the selected route no longer has the highest number of completions, then the route previously found to have the highest number of call completions is selected. The concept of completion rate factor routing can be extended to multiple carriers to yield a carrier completion rate feature routing technique. Routing may also be completed in accordance with network congestion to route advance a call.

13 Claims, 3 Drawing Sheets

AUTOMATIC ROUTING TECHNIQUE

TECHNICAL FIELD

This invention relates to a technique for routing calls through a telecommunications network.

BACKGROUND ART

Today, telecommunication traffic between two end points (e.g., two individual telephone subscribers) passes over one or more networks. Each network comprises at least one, and typically a plurality of trunk groups, each group comprising one or more copper cables, optical fibers, or radio channels. The trunk groups run between hubs, each hub comprising at least one telecommunications switch for connecting traffic to another hub. The process by which each switch selects an individual trunk group (i.e., a switched pair of conductors or a time slot within a multiplexed signal on a fiber or on a radio channel) is known as routing.

The decision made by each switch to route calls on a particular trunk group involves a variety of factors. Obviously, trunk operability is crucial to any decision to route traffic across a particular trunk group. Trunk bandwidth is also important since some classes of calls require higher bandwidth than others. Trunk length may be important since it is generally desirable to route calls along the shortest path. The cost associated with routing a call across a trunk may also be important since the lowest cost path is usually desirable.

The switches within an individual telecommunication network may employ one or more well known routing techniques to route calls pursuant to the factors discussed above. Intra-network routing strategies are not necessarily applicable for calls that pass from one network to another. Often, different networks are maintained by different entities. Timely information may not be available outside a network regarding the parameters necessary for the routing of calls thereto. As a result, calls routed to a recipient network may not be completed because of call blockage or congestion, leading to loss of revenue and customer dissatisfaction.

Thus, there is a need for a technique for routing calls between networks that maximizes call completions.

BRIEF SUMMARY OF THE INVENTION

Briefly, in accordance with a first aspect of the invention, a method is provided for automatically routing calls between a first network and at least one second network. Initially, calls are routed on the paths connecting the first and second networks. For each path, the history of call completions on that path is recorded. Thereafter, a Completion Rate Factor (CRF), representing the number of call completions is established. Thus, for example if ten calls have been routed on a particular path, and each call has been completed, the CRF for that path is 10/10. If only 6 of the 10 calls are completed, then the CRF is 6/10. Once a prescribed number of calls have been routed, the path whose CRF represents the highest number of call completions is selected for subsequent routing. Thereafter, future calls are routed on the selected path.

Advantageously, the above-described process of path selection is dynamic. Thus, for each call routed on the selected path, call completion is tracked. If the selected path no longer represents the highest number of call completions as compared to those previously recorded, then the path previously having the highest call completions is now selected and call completions on that path are now tracked.

In accordance with another aspect of the invention, the concept of routing calls based on the highest completion rate can be extended to situations where calls are routed over networks maintained by individual carriers. For each carrier, a Non-Transit Rate Factor (NTRF) is continuously computed to track how well calls complete to each carrier, without transit via a third country. Routing of calls can then be made on the basis of which carrier has the highest call completion rate without resorting to alternate transit. As with the CRF routing method discussed above, the NTRF method is dynamic. The NTRF is continuously monitored and carrier selection is based on the latest NTRF information. Call routing in this manner is referred to as the Carrier Completion Rate Feature (CCRF).

In accordance with yet another aspect of the invention, a call non-completion condition associated with trunk blocking is signaled back to a switch trying to route the call on the blocked trunk. Knowing that the call is blocked because of a blocked trunk, the switch then attempts routing over another trunk so as to "route advance" the call rather than terminate it.

DETAILED DESCRIPTION

Figure 1:
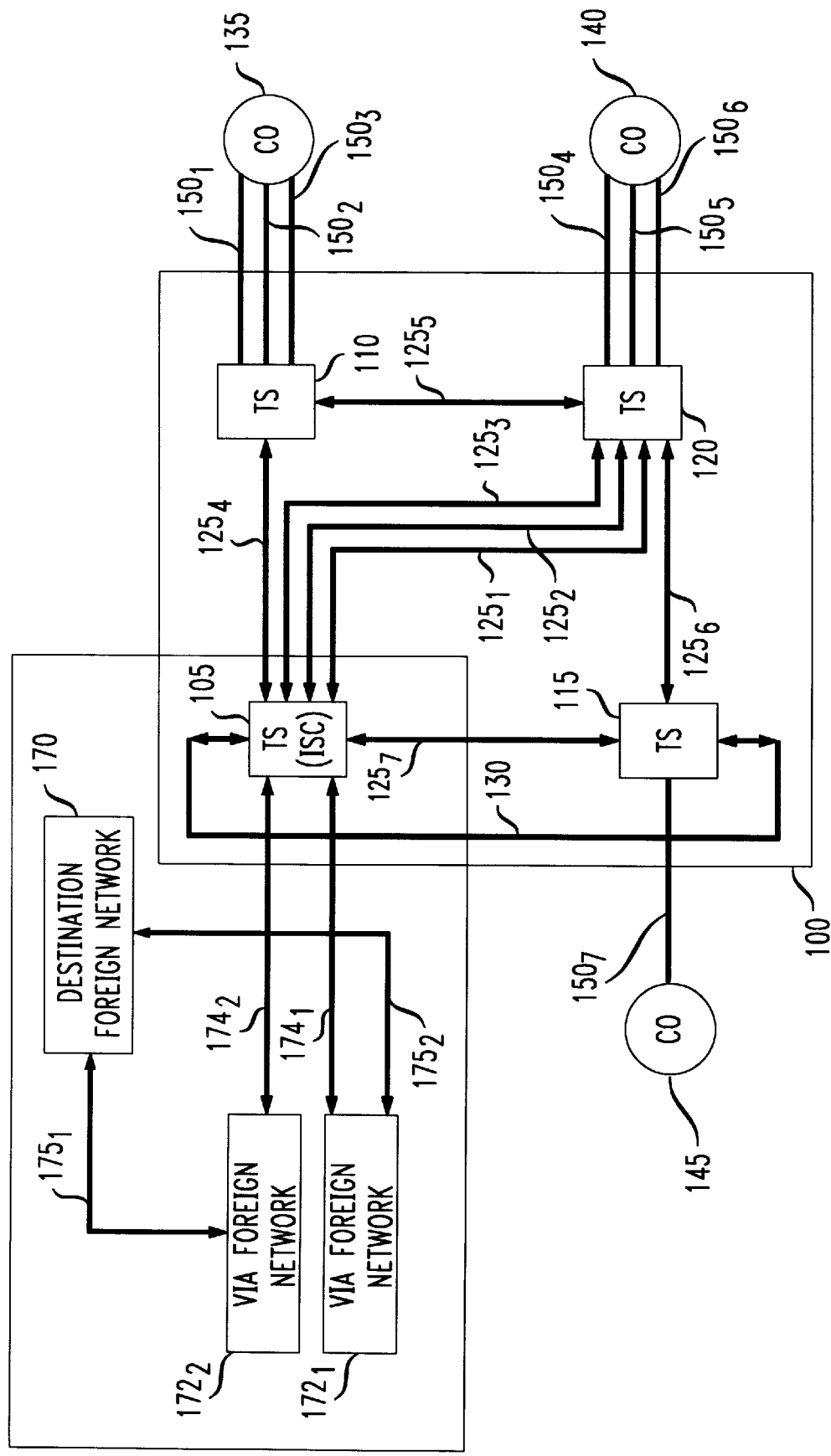
FIG. 1 is a block schematic of a telecommunications network for practicing the CRF routing method of the invention.

FIG. 1 illustrates a telecommunications network 100, such as the telecommunications network maintained by AT&T. The network 100 comprises a plurality of toll switches (TS's), such as TS's 105, 110, 115, and 120. Each TS typically comprises a model 4ESS toll switch formerly manufactured by AT&T. The TS's are interconnected via trunk groups (TG's), such as TG's $125_1$–$125_7$. In the illustrated embodiment, the TG's $125_1$–$125_3$ couple TS 105 to TS 120 while the TG $125_4$ couples TS's 105 and 110. The TG $125_5$ couples the TS's 110 and 120, whereas the TG $125_6$ couples the TS 120 to the TS 115. The TG $125_7$ couples the TS's 105 and 115.

The TS's 105, 110, 115, and 120 are linked to each other by a signaling network 130. In practice, the signaling network 130 comprises AT&T's SS7 signaling network for communicating out-of-band signaling information to each TS.

The TS's 110, 115, and 120 within the network 100 service Central Offices (CO's), for example CO's 135, 140 and 145. The CO's are of a well known construction and will not be discussed in detail. For purposes of discussion, it is sufficient to understand that each CO provides local service (i.e., dial tone) to one or more telephone stations (not shown). Each CO routes inter-exchange calls originating from the telephone stations served by that CO to a corresponding TS. Similarly, each CO routes a inter-exchange call received from its corresponding TS to a terminating telephone station. To this end, each CO is coupled to a TS via a one of TG's $150_1$–$150_7$. In the illustrated embodiment, TG's $150_1$–$150_3$ couple the CO 135 to the TS 110, whereas the TG's $150_4$–$150_6$ couple the CO 140 to the TS 120. The TG $150_7$ couples the CO 145 to the TS 115.

To enable the routing of calls through the network 100, the TS's 105, 110, 115, and 120 each store a profile of the characteristics of each TG connected to that switch. The profile stored by each TG contains information about the near and far end terminations (i.e., the ports in the near end and far end TS's where each trunk terminates), the capability of the trunk (i.e., its bandwidth) as well as the trunk type. The profiles of the TG's connecting each TS enables the TS to select the appropriate trunk group for routing a call using any of several well known routing techniques. An example of a typical trunk profile is described in U.S. Pat. No. 5,559,877, issued in the name of Gerald R. Ash et al., on Sep. 24, 1996, and assigned to AT&T (incorporated by reference herein).

In the illustrated embodiment, the TS 105 represents an International Switching Center (ISC), i.e., a switch that routes calls to a destination foreign network, such as network 170 by way of one or more via foreign networks, such as networks $172_1$ and $172_2$. Thus, the term ISC will be used hereinafter to refer to TS 105. To facilitate such foreign routing, the ISC is linked to the via foreign networks $172_1$ and $172_2$ via trunk groups $174_1$ and $174_2$, respectively, whereas each of the via networks is linked by trunk groups $175_1$ and $175_2$, respectively, to the destination foreign network 170.

While the profiles of the trunk groups $125_1$–$125_7$ and $174_1$–$174_2$ and the load information of such trunk groups are available to the TS's 105, 110, 115, and 120, the same information of the trunk groups lying beyond the via foreign networks $172_1$ and $172_2$ may not be available to the TS's. In particular, the trunk group profiles may not be available for foreign calls routed to the destination foreign network 170 via the TGs $175_1$ and $175_2$. Therefore, routing techniques that rely on trunk group profiles may not necessarily be applicable in such circumstances.

Figure 2:
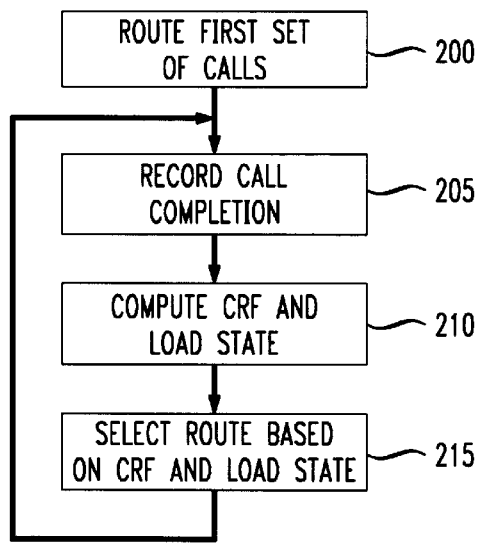
FIG. 2 is a flow chart representation of the steps associated with the CRF routing method.

Referring to FIG. 2, there is shown a flowchart representation of the steps of the method of the invention for routing calls under the circumstances described above. As will be appreciated from the following description, this routing method hereinafter will be referred to as the Completion Rate Factor (CRF) method because it takes account of call completions. To accomplish routing in accordance with call completions, a predetermined number of calls are routed (step 200) over the via foreign carrier trunk groups, such as the trunk groups $174_1$ and $174_2$ of FIG. 1. The time of each call is recorded along with data regarding whether each such call was completed (step 205).

A failure is scored for the call if a failure signaling message is received from the far end after the call seized an egress trunk (not shown) in a trunk group. If no such failure signaling message is received after the call seized an egress trunk, then the call is scored as a success. There is no call completion count for a call that did not seize an egress trunk. The ISC (TS 105) keeps a call completion history of the success or failure of the last ten (10) calls using a particular route and drops the oldest record and adds the call completion for the newest call on that route. Based on the number of call completions, a completion rate factor, representing the ratio of the completed calls to the total number of calls, is computed (step 210).

The load state information of the egress trunks, e.g., trunks $174_1$ and $174_2$ is computed by the ISC based on idle link bandwidth, bandwidth reservation, and traffic level. The load state of a trunk can be lightly loaded, heavily loaded, reserved, or busy. The route having the highest call completion and the most lightly loaded egress trunk group (TG) is then selected as the path over which calls are routed (Step 215).

The CRF routing process is dynamic in that the call completions are continuously tracked, as represented by the re-execution of step 205 following step 215. Thus, if TG $174_1$ of FIG. 1 had been selected, but now suddenly experiences a greater number of call non-completions, then calls will be routed over the route whose previously computed CRF represented the highest number of call completions.

In practice, call routing based on the above-described CRF method typically employs the following hierarchy as seen in table I

TABLE I

| COMPLETION STATE | Condition |
|---|---|
| NRFH (No Recent Failure History) | $\tau_c$(route) > 300 |
| HC (High Completion) | $\tau_c$(route) $\leq$ 300 and C(route) $\geq$ HCthr(rtype, tc, VFN) |
| AC (Average Completion) | $\tau_c$(route) $\leq$ 300 and LCthr (rtype, tc, VFN) $\leq$ C (route) < HCthr(rtype, tc, VFN) |
| LC (Low Completion) | $\tau_c$(route) $\leq$ 300 and C(route) < LC thr(rtype, tc, VFN) |

Where:
$\tau_c$ is the time in seconds since the last call failure recorded for a given route;
A route is a path specified by a route type, a destination foreign network (DFN) or a switch identification, a Via Foreign Network (VFN) or a switch identification, and a transport capability (tc);
tc identifies the transport capability which indicates whether the call is a voice call or a data call in which the data rate may be, for example, 64 kbps, 384 kbps or 1536 kbps;
rtype is the route type, which is one of: First Choice Alternate, Second Choice Alternate, First Choice Overflow, and Second Choice Overflow;
An alternate route uses a VFN which is in the same country as the DFN while an overflow route uses a third country.
C(route) is the completion rate for the route which is the number of completed calls out of the last ten (10) calls as recorded;
HCthr(rtype, tc, VFN) and LCthr(rtype, tc, VFN) are the High completion rate threshold, and the Low completion rate threshold, respectively, for each route type, tc and VFN which are based on Cavg(rtype, tc, VFN) as indicated in Table II;
Cavg(rtype, tc, VFN) is the average number of call completions (rounded to the nearest integer) out of the last ten calls for all routes with the specified rtype, tc and VFN. This average is computed every three minutes.

Table II lists typical completion rate thresholds:

TABLE II

| Cavg(rtype, tc, VFN) | 0 | 1 | 2 | 3 | 4 | 5 | 6 | 7 | 8 | 9 | 10 |
|---|---|---|---|---|---|---|---|---|---|---|---|
| HCthr(rtype, tc, VFN) | 5 | 5 | 6 | 6 | 7 | 8 | 8 | 9 | 10 | 10 | 11 |
| LCthr(rtype, tc, VFN) | 3 | 3 | 3 | 3 | 4 | 4 | 4 | 5 | 5 | 5 | 6 |

Every three minutes, the Cavg(rtype, tc, VFN) is computed, and the thresholds HCthr(rtype, tc, VFN) and LCthr(rtype, tc, VFN) are determined. On a per call basis, the call completion (C(route)) is compared to the appropriate HCthr(rtype, tc, VFN) and LCthr(rtype, tc, VFN) to select the route.

From the hierarchy indicated in Table I, calls are normally routed on the first route that experienced no recent failure or a high completion with a lightly loaded egress trunk group. A route experiencing no recent failure is defined as follows:

within a prescribed interval, say 300 seconds, no call failures (as defined previously) have occurred on this route. If such a route does not exist, then a route having an average completion rate with a lightly loaded egress trunk group is selected followed by a route having a low completion rate with a lightly loaded egress trunk group. If no routes with a lightly loaded egress trunk group are available, the routes with a heavily loaded egress trunk group are searched with the order of no recent failure or high completion, average completion and low completion. If no such routes are available, then routes with a reserved egress trunk group are searched on the same order based on the call completion rate.

Figure 3:
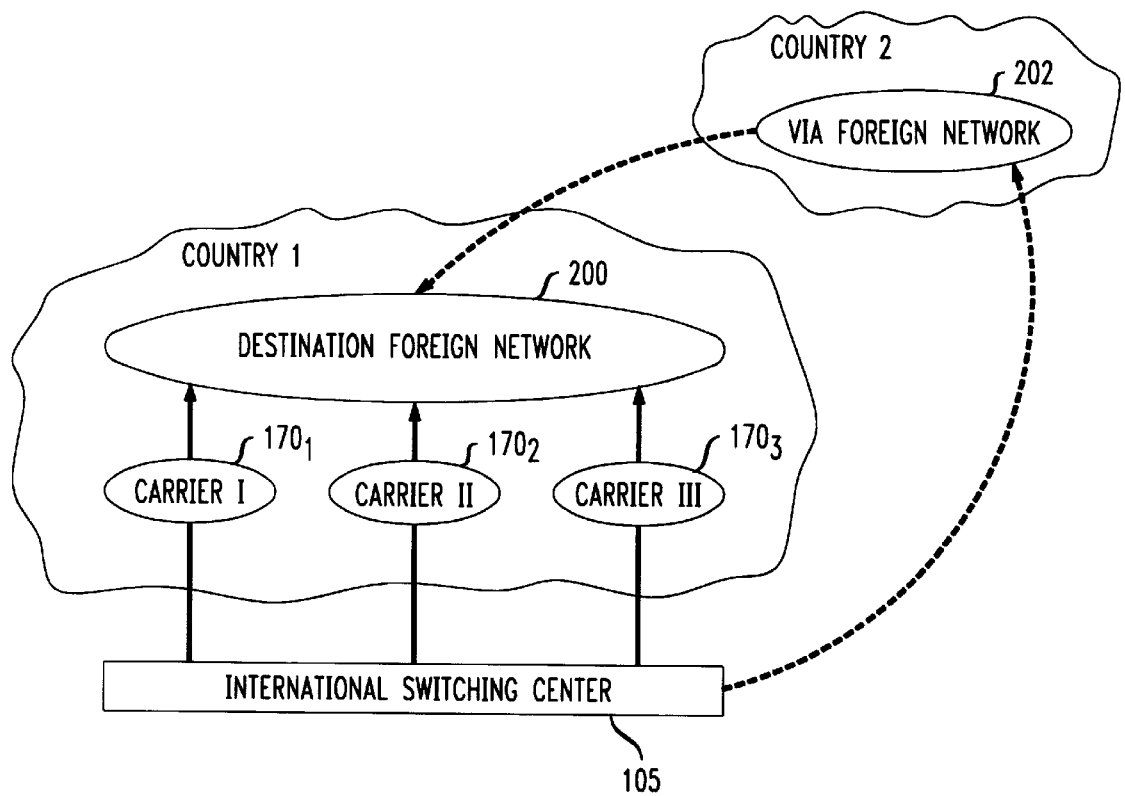
FIG. 3 is a block schematic showing the combination of a portion of the network of FIG. 1 and a foreign network to illustrate the CCRF routing technique of the invention.

The above-described technique for routing calls based on call completions can be extended to circumstances where multiple carriers provide connectivity as exemplified in FIG. 3 where three separate carriers $170_1$, $170_2$, and $170_3$ each serve a single Destination Foreign Foreign Network (DFN), in this case DFN 200, such as Tokyo, Japan, from the ISC (TS 105). As will be discussed below, this type of routing in the invention will hereinafter be referenced as the Carrier Completion Rate Feature (CCRF) routing. Generally, the ISC is free to route calls intended for the DFN 200 via any of the carriers $170_1$, $170_2$, and $170_3$. (There may be instances in which the caller requests a specific one of the carriers $170_1$, $170_2$, and $170_3$ to carry the call and thus, the ISC may not be free to select another carrier. Alternatively, the ISC may be under contract to provide a certain call volume of calls that originate within the network 100 of FIG. 1, or that transit through the network 100, for receipt by a specific carrier, thus restricting the ability to freely designate the first choice among the carriers.) However, if the first choice carrier fails to route the call, then the ISC can freely select the second carrier based on the Carrier Completion Rate Feature method of routing.

Assuming that the ISC may freely route calls among any of the carriers $170_1$, $170_2$, and $170_3$, a particular carrier is selected, in accordance with the invention, by choosing the carrier having the highest call completion rate without alternate transit. Non-alternate transit is defined as the routing of a call to a foreign carrier that passes directly via that carrier to DFN 200. The frequency at which calls pass directly via a foreign carrier, say foreign carrier $170_1$, directly to the DFN 200 is defined as the Non-Transit Rate Factor (NTRF). Alternate transit occurs when calls must be routed via an intermediate via Foreign Network (VFN) 202 in order to reach the DFN 200. Such alternate transit routing is undesirable because the cost of call transport is increased by the transport charges incurred in routing by the VFN 202 to the DFN 200.

Figure 4:
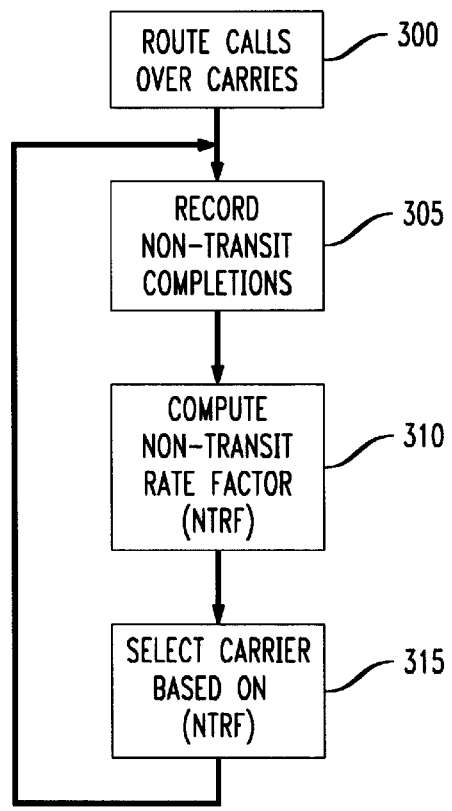
FIG. 4 is a flow chart representation of the steps associated with the CCRF routing method of the invention.

Routing of calls, based on the NTRF may best be understood by reference to FIG. 4. As depicted in FIG. 4, a prescribed number of calls are routed via the separate carriers $170_1$, $170_2$, and $170_3$ of FIG. 3 to gather a history of call completions (step 300). The completions enjoyed by each carrier which did not necessitate alternate transit are recorded (step 305). In accordance with the call completions not requiring alternate transit recorded during step 305, a Non-Transit Rate Factor (NTRF) is computed (step 310). The NTRF is established from the ratio of call completions that do not transit a third country to total call attempts. The NTRF for each carrier is maintained in much the same way that the Completion Rate Factor is maintained with respect to FIG. 2. The carrier having the highest NTRF is then selected (step 315).

Like the CRF method described with respect to FIG. 2, the Carrier Completion Rate Feature (CCRF) routing method described with respect to FIG. 4 is dynamic, as represented by the arrow showing re-execution of step 305 following step 315. In other words, the NTRF for the selected carrier is computed as calls are completed by that carrier. In the event that the selected carrier exhibits a drop in call completions not requiring alternate transit below that computed previously for one of the other carriers, then the carrier previously found to have the highest NTRF is now selected.

In accordance with yet another aspect of the invention, call routing using either of the CRF or CCRF techniques, may be enhanced using a technique known as Route Advance (RA). Simply stated, in accordance with the RA technique, alternate call paths are selected for routing if the recipient network has signaled back a congestion condition. This may be better understood by reference to FIG. 5. In the past, a call routed from the ISC (TS 105) to DFN 200 within country 1 via TG $176_1$ but not completed because of congestion would be dropped. Such dropped calls resulted in revenue loss and subscriber dissatisfaction.

Figure 5:
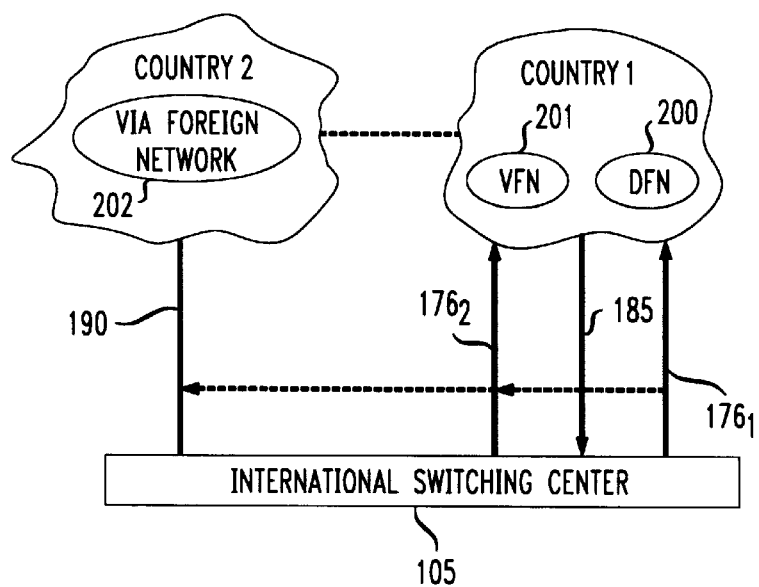
FIG. 5 is a block diagram illustrating the Route Advance (RA) technique of the Invention.

In accordance with the invention, when a foreign network, such as DFN 200 of FIG. 5 serving a country, such as country 1, can not complete a call to DFN 200 as a result of network congestion, then the foreign network signals that condition back to the ISC via a signaling trunk group (TG) 185, such as a particular cause value indicating congestion in a Signaling Release Message. Upon receipt of a signal indicating congestion on the trunk serving DFN 200, the ISC now selects a different trunk group, such as TG $176_2$ and attempts to route the call through a Via Foreign Network, such as VFN 201.

Should the network serving the VFN 201 again signal back a congestion condition via the TG 185, then the ISC will attempt to route the call to a transit country (e.g., VFN 202), via TG 190. After the call is routed to the VFN 202, an attempt would be made to route the call to the DFN 200. In the event that the call still can not be completed, then the call is returned (cranked back) to appropriate one of TS's 110, 115 and 120 of FIG. 1 that had initially received the call from the originating CO for possible further alternate routing via another ISC (not shown).

The foregoing describes different aspects of a general technique for routing a call based on call completion. While the techniques have been described for international network applications, the techniques are equally applicable for national network applications, metropolitan area network applications, as well as other network applications.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for routing calls between a first and second networks, comprising the steps of:
   (a) routing calls between the first and second networks across a plurality of routes, each formed by at least one trunk group;
   (b) recording, for each call across each route, a completion history indicative of whether said call was completed over an egress trunk within an egress trunk group to a far end following trunk seizure;
   (c) establishing a Completion Rate Factor (CRF) for each route in accordance with the call completion history;
   (d) establishing a load state for each route based on idle link bandwidth and reservation and traffic level on that route;

(e) selecting, among the routes over which future calls may be routed, the route having a CRF representing greatest call completions and lightest load state; and (f) routing future calls on the selected route.

2. The method according to claim 1 wherein the completion history is determined based on whether a failure signaling message is received from the far end following seizure of the egress trunk.

3. The method according to claim 1 wherein the steps of (b), (c), (d), (e), and (f) are performed repeatedly in succession.

4. The method according to claim 1 wherein the step of selecting a route comprises the step of selecting the route having a lightly loaded egress trunk group.

5. The method according to claim 1 wherein the selecting step comprises the step of selecting the route having no non-completions within a prescribed interval.

6. The method according to claim 3 wherein the prescribed interval comprises 300 seconds.

7. The method according to claim 5 wherein if each route has at least one non-completion within the prescribed interval, then calls are routed on the path having the highest number of call completions and such call completions exceed a prescribed high call completion threshold.

8. The method according to claim 7 wherein if each route has at least one non-completion within the prescribed interval, and the highest number of call completions does not exceed the prescribed high call threshold, then calls are routed on the path whose average number of call completions exceeds a prescribed average call completion threshold.

9. The method according to claim 8 wherein if each route has at least one non-completion within the prescribed interval, the highest number of call completions does not exceed the prescribed high call threshold, and the highest number of call completions does not exceed the average number of call completions, then calls are routed on a path whose call completions exceeds a prescribed low call completion threshold.

10. The method according to claim 5 wherein the steps are performed repeatedly for the routes with a heavily loaded state egress trunk groups.

11. The method according to claim 5 wherein the steps are performed repeatedly for the routes with reserved state egress trunk groups.

12. A method for routing calls between first and second networks via multiple carriers, each capable of utilizing an overflow path for alternate transit, the method comprising the steps of:

(a) routing calls between the first and second networks via each of the carriers;

(b) recording, for each call carrier, a completion history of calls carried by said carrier indicative of whether the call was completed without alternate transit;

(c) establishing for each carrier a Non-Transit Rate Factor (NTRF) in accordance with the call completions not requiring alternate transit;

(d) selecting the carrier having a NTRF representing the highest number of call-completions not requiring alternate transit; and (e) routing future calls over the selected route.

13. The method according to claim 12 wherein steps (b)–(e) are repeated continuously.

* * * * *